United States Patent
Pfister

(10) Patent No.: US 11,921,128 B2
(45) Date of Patent: Mar. 5, 2024

(54) APPARATUS FOR INSPECTING PHARMACEUTICAL CONTAINERS

(71) Applicant: SCHOTT PHARMA SCHWEIZ AG, St. Gallen (CH)

(72) Inventor: Andreas Pfister, Jonschwil (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 362 days.

(21) Appl. No.: 17/032,662

(22) Filed: Sep. 25, 2020

(65) Prior Publication Data

US 2021/0096145 A1 Apr. 1, 2021

(30) Foreign Application Priority Data

Sep. 27, 2019 (EP) .................................... 19200246

(51) Int. Cl.
*G01N 35/02* (2006.01)
*B65G 47/91* (2006.01)
(Continued)

(52) U.S. Cl.
CPC ........... *G01N 35/02* (2013.01); *B65G 47/915* (2013.01); *G01N 21/01* (2013.01); *G01N 21/90* (2013.01);
(Continued)

(58) Field of Classification Search
CPC ........ G01N 35/02; G01N 21/01; G01N 21/90; G01N 35/0099; G01N 21/9009;
(Continued)

(56) References Cited

U.S. PATENT DOCUMENTS 2,531,529 A * 11/1950 Price .................. G01N 21/9027
356/427
4,378,493 A 3/1983 Dorf
(Continued)

FOREIGN PATENT DOCUMENTS

CN 102159475 8/2011
CN 104062302 9/2014
(Continued)

OTHER PUBLICATIONS

D5—XP055885133: "Schott World—Mitarbeitermagazin", Schott World—Mitarbeitermagazin, vol. Jan. 2019, Jan. 1, 2019 (Jan. 1, 2019), pp. 20-21 + coverpage with English translation, 6 pages.
(Continued)

*Primary Examiner* — Benjamin R Schmitt
(74) *Attorney, Agent, or Firm* — Ruggiero McAllister & McMahon LLC

(57) ABSTRACT

An apparatus for inspecting a pharmaceutical cylindrical container made of glass or polymer includes a handling device that has a first holder that holds a lateral surface of the pharmaceutical cylindrical container and includes a first support wheel and a second support wheel. The handling device moves such that the pharmaceutical cylindrical container is transferred from a first transfer position to the inspection area and from the inspection area to a second transfer position. The handling device and/or a friction wheel rotate the pharmaceutical cylindrical container around a container longitudinal axis. A first plane is defined through the first rotational axis of the first support wheel and the container longitudinal axis, while a second plane is defined through the second rotational axis of the second support wheel and the container longitudinal axis. The first and second planes intersect at an angle in a range of 45° to less than 120°.

20 Claims, 4 Drawing Sheets

(51) Int. Cl.
*G01N 21/01* (2006.01)
*G01N 21/90* (2006.01)
*G01N 35/00* (2006.01)
*B65G 47/84* (2006.01)

(52) U.S. Cl.
CPC ....... *G01N 35/0099* (2013.01); *B65G 47/846* (2013.01); *B65G 2201/0235* (2013.01); *G01N 21/9009* (2013.01)

(58) Field of Classification Search
CPC .. B65G 47/915; B65G 47/848; B65G 47/846; B65G 2201/0235
See application file for complete search history.

(56) References Cited

U.S. PATENT DOCUMENTS

| | | |
|---|---|---|
| 5,473,425 A | 12/1995 | Tokumaru |
| 5,917,588 A | 6/1999 | Addiego |
| 6,437,357 B1 | 8/2002 | Weiss |
| 7,551,274 B1 | 6/2009 | Wornson |
| 9,995,691 B2 | 6/2018 | Piana |
| 10,060,858 B2 | 8/2018 | Schwab |
| 10,337,977 B1 | 7/2019 | Kuhn |
| 2002/0015148 A1 | 2/2002 | Tomomatsu |
| 2005/0195480 A1 | 9/2005 | Brown |
| 2006/0045324 A1 | 3/2006 | Katayama |
| 2008/0094618 A1 | 4/2008 | Sones |
| 2008/0239301 A1 | 10/2008 | Yokota |
| 2008/0291438 A1 | 11/2008 | Akkerman |
| 2008/0297784 A1 | 12/2008 | Leblanc |
| 2010/0095790 A1 | 4/2010 | Raupp |
| 2010/0111515 A1 | 5/2010 | Saitoh |
| 2010/0118136 A1 | 5/2010 | van Riet |
| 2011/0216187 A1 | 9/2011 | Boecker |
| 2012/0276177 A1 | 11/2012 | Hilliard, Jr |
| 2013/0084594 A1 | 4/2013 | Bresler |
| 2013/0162986 A1 | 6/2013 | Kibat |
| 2016/0054235 A1 | 2/2016 | Kim |
| 2016/0231555 A1 | 8/2016 | Freifeld |
| 2017/0053394 A1 | 2/2017 | Uemura |
| 2017/0154417 A1 | 6/2017 | Niedermeier |
| 2019/0164269 A1 | 5/2019 | Klaeger |
| 2021/0088454 A1 | 3/2021 | Heuft |
| 2021/0333221 A1 | 10/2021 | Klimmey |

FOREIGN PATENT DOCUMENTS

| | | |
|---|---|---|
| CN | 104458760 | 3/2015 |
| DE | 102011113670 | 3/2013 |
| DE | 102016114190 | 2/2018 |
| EP | 2774678 | 9/2014 |
| EP | 3797883 | 3/2021 |
| EP | 3798621 | 3/2021 |
| EP | 3855173 | 7/2021 |
| EP | 3855174 | 7/2021 |
| JP | H0336949 | 4/1991 |
| JP | 2000214104 | 8/2000 |
| JP | 2005227257 | 8/2005 |
| JP | 2015169449 | 9/2015 |

OTHER PUBLICATIONS

D5a—XP055885138: Schott World Jan. 2019 (KircherBurckhardt/Schott), pp. 20 and 21; document D5 in higher resolution with English translation, 4 pages.

* cited by examiner

APPARATUS FOR INSPECTING PHARMACEUTICAL CONTAINERS

CROSS REFERENCE TO RELATED APPLICATIONS

This application claims benefit under 35 USC § 119 of European Application 19 200 246.7 filed Sep. 27, 2019, the entire contents of which are incorporated herein by reference.

BACKGROUND

1. Field of the Invention

The present invention relates to an apparatus for inspecting a pharmaceutical container made of glass or of a polymer.

2. Description of Related Art

For quality assurance, it is common to inspect the finished pharmaceutical container or intermediate products thereof during a manufacturing process. If a defect is detected, the product or the intermediate product can be disregarded from further processing.

From the document DE 10 2011 113 670 A1 an apparatus for the inspection of sheet glass is known. Further, the document DE 10 2016 114 190 A1 describes a method and a device for optical examination of transparent bodies.

Especially pharmaceutical containers such as syringes, carpules, vials etc. have to fulfil strict quality standards. For example, it has to be avoided that these containers comprise defects like bulges, depressions, scratches, adhering particles, bubbles or trapped foreign material. Since pharmaceutical containers are mass products, the inspection has to be conducted as fast as possible. Beneath the reliable detection of defects in a short time, it has to be assured that the apparatuses used for inspecting the damageable pharmaceutical containers do not cause defects on the containers.

Known apparatuses for inspecting pharmaceutical containers do not fulfil the above mentioned requirements with regard to a fast and nondestructive inspection.

SUMMARY

The invention described herein addresses the problem of improving and further developing an apparatus for inspecting a pharmaceutical container made of glass or of a polymer such that a fast and nondestructive inspection is achieved.

In an embodiment the present invention provides an apparatus for inspecting a pharmaceutical cylindrical container made of glass or of a polymer, wherein the apparatus comprises a handling device and a friction wheel, wherein the handling device comprises at least one holder, for holding the container on its lateral surface, wherein the holder comprises at least a first support wheel and a second support wheel for supporting the container, wherein the container is rotatable around its longitudinal axis by rotating the first and second support wheels and/or by rotating the friction wheel, wherein a rotational axis of the first support wheel and the longitudinal axis of the container define a first plane, wherein a rotational axis of the second support wheel and the longitudinal axis of the container define a second plane, and wherein the first plane and the second plane intersect at an angle in a range of 45° to less than 120°, preferably 50° to 90°, more preferably of 60° to 80°, more preferably of 65° to 75°, most preferably at an angle of about 70°.

One of the advantages is that a rotatable holder provides a fast movement of the container. Since the container can be rotated around its longitudinal axis by the friction wheel and/or the support wheels it is possible to inspect the whole container body with a suitable detector. Hence, an effective detection of defects can be achieved. It is pointed out that the container can be inspected in the inspection area by any procedure and/or by any device, especially when the container is in contact with the friction wheel such that the container can be rotated around its longitudinal axis.

The inventors surprisingly found that at an angle of less than 45° the container is vibrating too much for being inspected. Further, there is the risk that the container drops off the support wheels while being inspected. At an angle of 45° or larger the risk of dropping is very low whereas the surface of the container being blocked by the support wheels is maximized and so is the detectable area of the container. At an angle of more than 120° the surface of the container being blocked by the support wheels is very large such that a fast inspection of the container is almost impossible. At an angle between 50° and 90° vibrations of the container being located on the support wheels are occurring but the rotation of the container is smooth enough to enable a sufficient inspection. Within the range of 60° and 80° the detectable surface of the container is large enough and the vibrations of the container are small enough that all different kinds of defect are detectable in a short time. At an angle in the range of 65° to 75° vibrations are almost negligible and the detectable surface is still large enough that very small defects of the container are detectable in a minimum of time. Especially at an angle of about 70°, i.e. 70°±1° the inspection of the container is possible with maximum quality in a minimum of time, for example a clock frequency of more than 60 containers per minute, even 80 container per minute or more is possible.

To further enhance the stability of the system, it is preferred that the distance between the rotation axis of the friction wheel and the rotation axis of the first support wheel and the distance between the rotation axis of the friction wheel and the rotation axis of the second support wheel are equal. It is further preferred that the friction wheel is arranged centered with respect to the support wheels. Since the longitudinal axis of the container depends on the diameter of the container, it is preferred that the position of the support wheels can be changed. Thereby, the support wheels can be positioned in such a way, that the above described angle lies within the described range, depending on the diameter of the container being inspected. In a further preferred embodiment, the support wheels and/or the friction wheels are replaceable such that support wheels and/or a friction wheel with different diameters can be arranged when containers of a different diameter should be inspected. For one of ordinary skill in the art it is obvious, that the distance between the support wheels and the friction wheel define the diameter of the container being inspected when the support wheels are positioned in such a way that a supported container would be arranged in the inspection position.

In a preferred embodiment the handling device is movable such that the container can first be transferred from a first transfer position into an inspection area and second from the inspection area into a second transfer position and/or the holding mean and/or the friction wheel is movable to and fro for bringing the container within the inspection area into contact with the friction wheel, such that the container is rotatable around its longitudinal axis by rotating the first and second support wheels and/or by rotating the friction wheel. An advantage is that by two different movements a high inspection speed can be achieved. With the first movement, i.e. the movement of the handling device to bring the container to and from the inspection area, the pharmaceutical cylindrical container is brought in the inspection area and thus, close to the friction wheel. With the second movement, i.e. the movement, wherein the holder and/or the friction wheel moves to and fro for bringing the container within the inspection area into contact with the friction wheel, the pharmaceutical cylindrical container, which is already in contact with the two wheels of the holder, is getting into contact with the friction wheel. Only by performing these two movements, it is possible to bring the pharmaceutical cylindrical container very smoothly into contact with the friction wheel without damaging the container and without causing any vibration. In contrast, if only one movement is applied, the pharmaceutical cylindrical container is vibrating when it gets into contact with the friction wheel, and thus damage can occur and in addition, between the positioning of the container and the measurement a certain time must pass by to stop the vibration of the container. Thus, an apparatus performing these two movements is suitable to achieve a high clock frequency of more than 60 containers per minute, even 80 container per minute or more.

The movement of the handling device for bringing the container to and from the inspection area is not particularly limited. It can be any movement, e.g. a complex movement of a robot arm, a linear movement, or a rotation. If the handling device is rotatable such that the container can first be transferred from a first transfer position into an inspection area and second from the inspection area into a second transfer position, the speed of the apparatus can be further increased, since the rotation around an axis is a very accurate movement.

The movement of the holder within the inspection area is not particularly limited; it can either be together with the whole handling device or only the holder moves, for example up and down, while the rest of the handling device is not moving. Preferably, the holder or the handling device is movable to and fro along a first axis for bringing the container within the inspection area into contact with the friction wheel. Thereby, the vibration can be further reduced and damage can be further prevented. This, in turn increases the inspection speed.

In a preferred embodiment, the handling device is rotatable such that the container can first be transferred from a first transfer position into an inspection area and second from the inspection area into a second transfer position. Additionally or alternatively the friction wheel, the holder and/or the handling device, preferably the handling device, is movable to and fro along a first axis for bringing the container within the inspection area into contact with the friction wheel.

In general, the two movements can be executed predominately consecutive, consecutively, or simultaneously. In a preferred embodiment, the movement of the handling device from the first transfer position into the inspection area, i.e. the "first movement", and the movement of the holder and/or of the friction wheel for bringing the container into contact with the friction wheel, i.e. the "second movement", are executed predominately consecutive or consecutively, more preferably consecutively.

The term "pharmaceutical container" refers to a container used to store medical products. A pharmaceutical container can be a syringe, a vial, an ampoule, a cartridge or any special article of tubing. The diameter of the containers being inspected by the apparatus according to the invention may be in the range of 4 mm to 80 mm, preferably 6 mm to 50 mm.

The term "longitudinal axis" refers to the line, especially the rotational axis that passes from the bottom to the top of the container.

The term "inspection area" refers to an area enclosing the position in which the container is positioned when it is inspected.

Herein, the lateral surface of the pharmaceutical cylindrical container is the outer surface of the cylindrical portion of the container. Preferably, there is not any contact of the apparatus to the base and top of the pharmaceutical cylindrical container. By laying the container with its lateral surface horizontally on the support wheels during the inspection, it is possible to shine light through at least almost the whole container. Hence, it is possible to inspect the pharmaceutical cylindrical container at least almost without any shadow if the container is held only on its lateral surface by the holder and the friction wheel during the measurement. It is even possible that the top and/or the bottom portion of the container can be inspected, when the container is held only on its lateral surface by the holder and the friction wheel during the measurement.

It should be noted that the first transfer position and the second transfer position could be identical positions or could be different positions.

The expression "cylindrical container" refers to a container that comprises at least a cylindrical part. A container like a syringe, a carpule or an ampule that comprises for example non-cylindrical ends is therefore a cylindrical container. Further, the lateral surface of the cylindrical container does not have to be smooth. The lateral surface can comprise grooves or ridges or ripples or any other structure. Further, the lateral surface can have a waved surface.

According to a preferred embodiment, the handling device comprises three holder, wherein the holder are arranged on a circle with an angle of 120° to each other. Arranging three holder within an angle of 120° has the advantage that at the same time one of the holder can be located in the transfer position another one in the inspection area and another one in the second transfer position. Hence, a high clock frequency can be achieved.

In a preferred embodiment, the apparatus comprises a transportation device for transporting the container into the first transfer position and receiving the container from the handling device in the second transfer position. Providing a transportation device has the advantage that the container can be fed in sync with the clock frequency of the handling device.

In a preferred embodiment, the apparatus further comprises a transportation device, a first transfer device and a second transfer device. The transportation device is configured to transport the container to the first transfer device and to receive the container from the second transfer device. Further, the first transfer device is configured to take the container from the transportation device and to transfer it into the first transfer position, wherein the first transfer device comprises at least one holding arrangement for holding the container. Preferably the container is held on its lateral surface, wherein the first transfer device is rotatable such that the container, when hold by the first holding arrangement, can be brought into the first transfer position.

Additionally, the second transfer device is configured to receive the container from the handling device, wherein the second transfer device comprises at least one holding arrangement for holding the container. Preferably the container is held on its lateral surface, wherein the second transfer device is rotatable such that the container can be transferred from the second transfer position onto the transportation device such that the container is positioned, preferably with its lateral surface, on the transportation device. This arrangement has the advantage that the container can be fed at a very high speed, whereby scratching or otherwise damaging the container is prevented because of the transfer devices being rotatable.

According to a preferred embodiment, the first transfer device comprises three holding arrangements, wherein the holding arrangements are arranged on a circle with an angle of 120° to each other. Additionally or alternatively, the second transfer device can comprise three holding arrangements, wherein the holding arrangements are arranged on a circle with an angle of 120° to each other. This construction is advantageous since the conveying speed is high and the apparatus is compactly constructed.

In a preferred embodiment, the transportation device is a conveyor belt. A conveyor belt has the advantage that it can be easily constructed and controlled. Furthermore, a conveyor belt has the advantage, that the containers can be transferred laying on their lateral surface which prevents them from being dropped.

According to a preferred embodiment the holding arrangement(s) of the first transfer device and/or the holding arrangement(s) of the second transfer device and/or the holder of the handling device comprises a suction element. Hence, the container can be picked up easily by sucking it onto the holding arrangement. Furthermore, the container is held securely by the suction element during the transfer, i.e. when the transfer device or the handling device is rotating or otherwise moving.

In general, for the surface of the wheels being in contact with the container, any kind of material, for example polymer, metal and ceramic, can be used. According to a preferred embodiment, at least the surface of the support wheels being in contact with the container and/or at least the surface of the holding arrangement of the first transfer device being in contact with the container and/or at least the surface of the holding arrangement of the second transfer device being in contact with the container and/or the surface of the friction wheel being in contact with the container comprises a polymer, for example polyoxymethylene or polyacetale, or a steel, for example a ball bearing steel, for avoiding scratches on the container and to ensure a slip-free acceleration and smooth rotation of the container. Using one of these materials, preferably Polyoxymethylene or Polyacetale, is advantageous since damaging of the container is prevented and a slip-free acceleration and smooth rotation of the container can be ensured.

In a preferred embodiment, the holder or the handling device is movable to and fro along a first axis for bringing the container within the inspection area into contact with the friction wheel. The movement of the handling device to and fro a first axis can easily be synchronized with the movement of other parts of the apparatus. Further, a to and fro movement along a first axis can be realized with simple means, such that the risk of a failure of the apparatus is at least reduced. If the entire handling device is movable, the construction of the apparatus is further simplified.

According to a further preferred embodiment, the first transfer device and the second transfer device, preferably the handling device, the first transfer device and the second transfer device, are movable to and fro along the first axis. This is advantageous since the movement of the transfer devices and of the handling device can by synchronized for increasing the conveying speed.

In a preferred embodiment, the first transfer device is movable to and fro along a second axis and/or wherein the second transfer device is movable to and fro along a third axis. Additionally, the first axis and the second axis intersect at an angle in the range of 30° to 60°, preferably 40° to 50°, more preferably at an angle of 45°, and/or the first axis and the third axis intersect at an angle in the range of 30° to 60°, preferably 40° to 50°, more preferably at an angle of 45°. It is noted that the above-mentioned angle is the smallest of the two angles formed when two lines intersect.

According to a preferred embodiment, at least one drive, preferably a cam gear and/or an electromotor, is arranged for moving the first transfer device and/or the second transfer device and/or the handling device along the first axis and/or along the second axis and/or along the third axis. It is possible, that each holding arrangement of the first transfer device and/or the second transfer device is movable individually, for example by an electromotor. Further, each holder of the handling device might be movable individually, for example by an electromotor. This has the advantage that every single part is controllable without the other parts. Furthermore, at least the first transfer device or at least the second transfer device or at least the handling device might be movable by separate drive. Hence, the apparatus will be less complex. In a preferred embodiment, the first transfer device, the second transfer device and the handling device are movable, for example along the first axis, by the same drive. For this purpose, the transfer devices and the handling device might be arranged on a single structure, for example a board. This structure might be movable by a cam drive and/or an electromotor or any similar construction.

It is noted that the present invention also relates to a system comprising an apparatus according herein and at least one pharmaceutical cylindrical container.

BRIEF DESCRIPTION OF THE DRAWINGS

There are several ways how to design and further develop the teaching of the present invention in an advantageous way. To this end, following explanation of preferred examples of embodiments of the invention, illustrated by the drawing on the other hand. In connection with the explanation of the preferred embodiments of the invention by the aid of the drawing, generally preferred embodiments and further developments of the teaching will be explained. In the drawing

DETAILED DESCRIPTION

Figure 1:
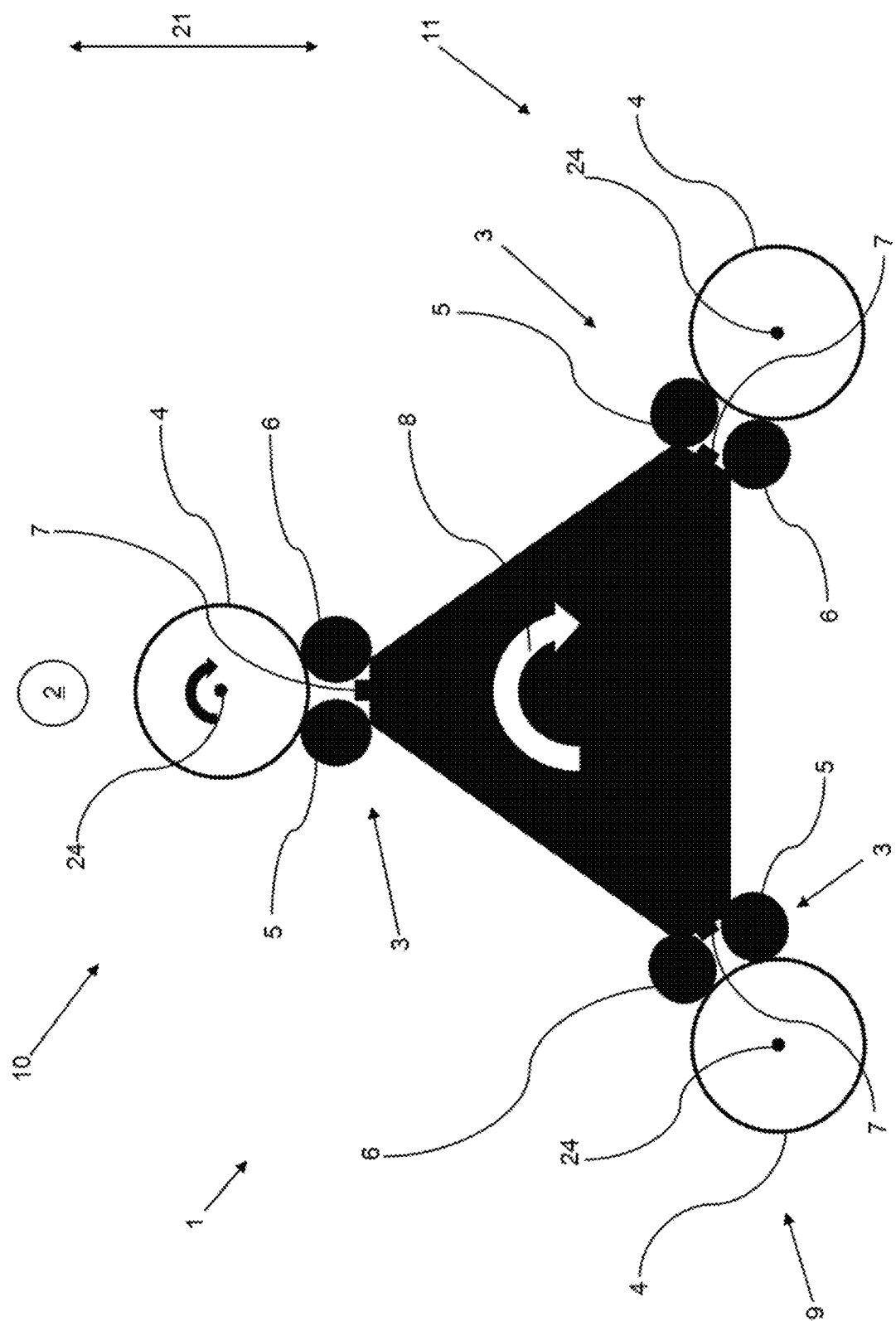
FIG. 1 shows a schematic side view of an apparatus according to an embodiment.

In the following description of embodiments, the same reference numeral designate similar components. For a better understanding not every element shown in a figures is always depicted with a reference numeral.

FIG. 1 shows a schematic side view of an apparatus according to an embodiment. The apparatus comprises a handling device 1 and a friction wheel 2. The handling device 1 comprises three holder 3 for holding a pharmaceutical container 4 made of glass or of a polymer. As can be seen, the container 4 has a circular cross section and is at least in this region cylindrically formed. The holder 3 each comprise a first support wheel 5, a second support wheel 6 and a suction element 7.

Hence, the holder 3 are configured for holding the container 4 on its lateral surface. Further, as indicated by the arrow 8, the handling device 1 is rotatable such that the container 4 can first be transferred from a first transfer position 9 into an inspection area 10 and second from the inspection area 10 into a second transfer position 11. The holder 3, respectively the handling device 1, and/or the friction wheel 2 are movable to and fro a first axis 21 such that the container 4 being located in the inspection area 10 can be brought into contact with the friction wheel 2. When the friction wheel 2 is in contact with the container 4, i.e. in the inspection position, the container can be rotated around its longitudinal axis 24, for example by rotation the friction wheel 2. Therefore, the whole surface of the container 4 can be inspected. After the inspection is completed, the handling device 1 is rotated further, such that the container 4 is transferred into the second transfer position 11.

FIG. 1 further shows that the three holder 3 are arranged on a circle with an angle of 120° from each other.

Figure 2:
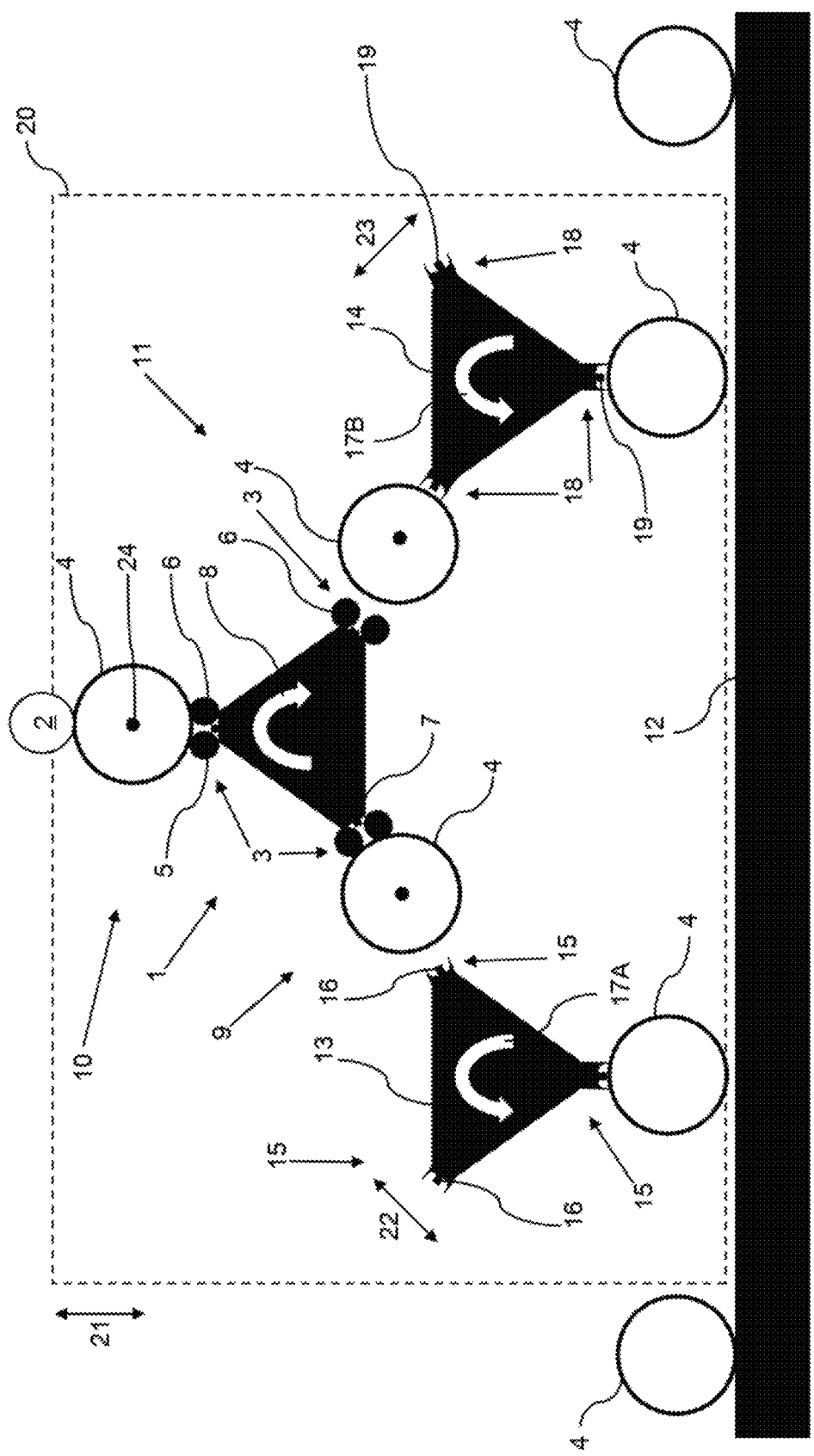
FIG. 2 shows a schematic side view of an apparatus according to an embodiment.

FIG. 2 shows a schematic side view of an apparatus according to another embodiment. The apparatus comprises a handling device 1 and a friction wheel 2 as described with regard to FIG. 1. Further, the apparatus comprises a transportation device 12, i.e. a conveyor belt, a first transfer device 13 and a second transfer device 14. The transportation device 12 is configured to transport the container 4 to the first transfer device 13 and further receives the container 4 from the second transfer device 14.

The first transfer device 13 is configured to take the container 4 from the transportation device 12 and to transfer it into a first transfer position 9. The first transfer device 13 comprises three holding arrangements 15 for holding the container 4, preferably on its lateral surface. For securely holding the container 4 each holding arrangement 15 comprises a suction element 16 for securely holding the container 4. The first transfer device 13 is rotatable as indicated by arrow 17A such that the container 4 can be transferred into the first transfer position 9.

The second transfer device 14 is configured to receive the container 4 from the handling device 1. Further, the second transfer device 14 comprises three holding arrangements 18 for holding the container 4, preferably on its lateral surface. The second transfer device 14 is rotatable as indicated by arrow 17B such that the container 4 can be transferred from the second transfer position 11 onto the transportation device 12. Preferably, the container 4 is positioned with its lateral surface on the transportation device 12. Each of the holding arrangements 18 comprise a suction element 19 for securely holding the container 4.

FIG. 2 further shows that the handling device 1, the first transfer device 13 and the second transfer device 14 are positioned on the same structure 20, for example a board, such that the devices are all together movable to and fro the axis 21.

Additionally, the first handling device 13 is movable to and fro a second axis 22 and the second handling device 14 is movable to and fro a third axis 23. The first axis 21 and the second axis 22 intersect at an angle of about 45°. Additionally, first axis 21 and the third axis 23 intersect at an angle of about 45°. The holding arrangements 15 of the first transfer device 13 are arranged on a circle with an angle of 120° to each other. Also, the holding arrangements 18 of the second transfer device 14 are arranged on a circle with an angle of 120° to each other.

Figure 3:
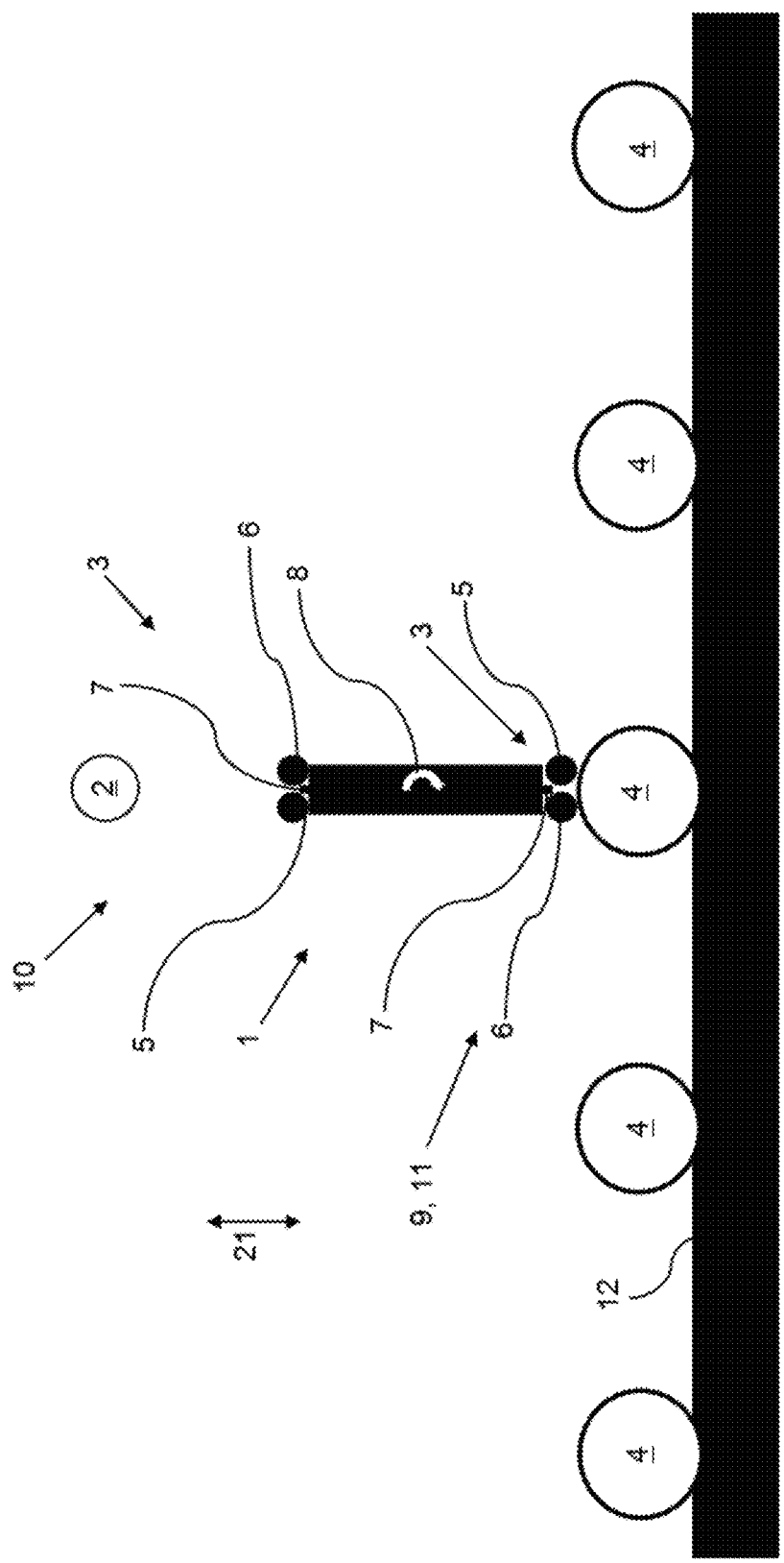
FIG. 3 shows a schematic side view of an apparatus according to an embodiment.

FIG. 3 shows a schematic side view of an apparatus according to another embodiment. The apparatus comprises a handling device 1 and a friction wheel 2. In contrast to the embodiments of FIGS. 1 and 2 this handling device 1 only comprises two holder 3. Each of the holder 3 comprises a first support wheel 5, a second support wheel 6 and a suction element 7.

As indicated by arrow 8, the handling device 1 is rotatable such that a container 4 can first be transferred from a first transfer position 9 into an inspection area 10. For bringing the container 4 into contact with the friction wheel 2, the holder 3, respectively the handling device 1, and/or the friction wheel 2 are movable to and fro a first axis 21. After the inspection of the container 4 is completed, the handling device 1 is rotated for bringing the container from the inspection area 10 into a second transfer position 11, which is identical with the first transfer position 9.

Even though in the embodiments shown in FIGS. 1 to 3 the holder 3, respectively the handling device 1 and/or the friction wheel 2 are described as being movable along a first axis 21 the movement does not have to be a linear movement. It is also possible that these components fulfil a no-linear movement.

Figure 4:
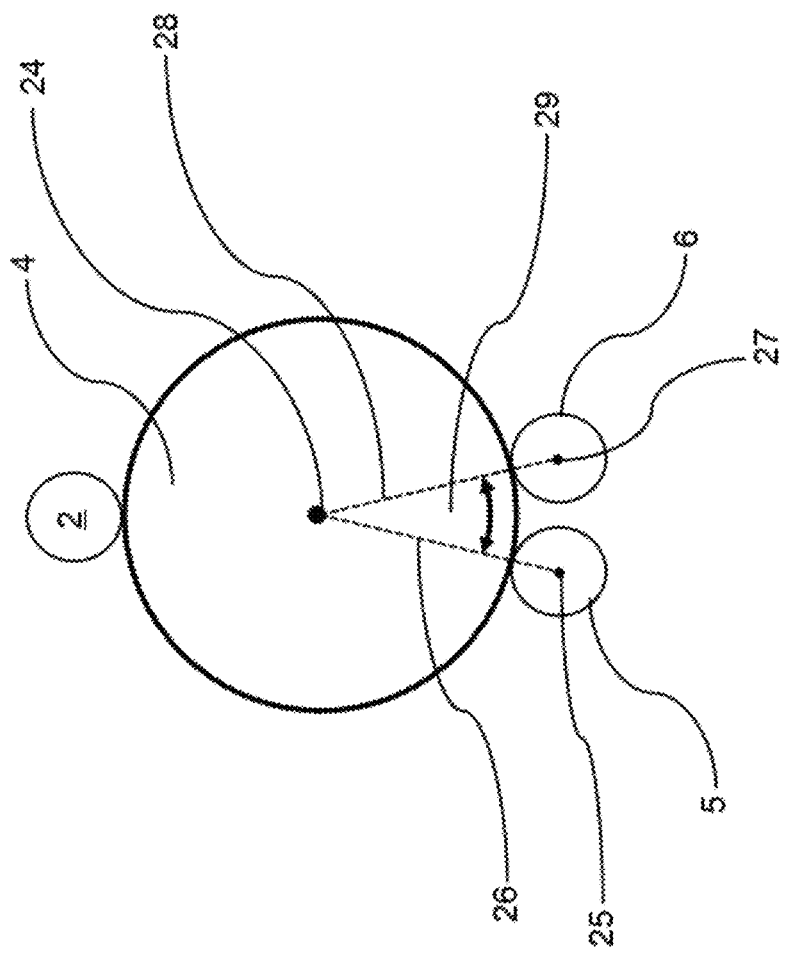
FIG. 4 shows in a schematic side view a holder of an apparatus according to an embodiment.

Without being considered limiting with respect to the embodiments shown, FIG. 4 serves to illustrate the arrangement of the first support wheel 5 and the second support wheel 6 to each other. FIG. 4 shows a container 4 being supported by the first support wheel 5 and the second support wheel 6. As can be seen, the rotational axis 25 of the first support wheel 5 and the longitudinal axis 24 of the container 4 define a first plane 26. Additionally the rotational axis 27 of the second support wheel 6 and the longitudinal axis 24 of the container 4 define a second plane 28. The first plane 26 and the second plane 28 intersect at an angle 29. According to a preferred embodiment the angle 29 ranges from 45° to less than 120°, preferably 50° to 90°, more preferably of 60° to 80°, more preferably of 65° to 75°, most preferably at an angle of about 70°. One of ordinary skill in the art will understand, that the position of longitudinal axis 24 depends on the diameter of the container. Hence, when the apparatus is used for container with different diameter, the position of the first and second support wheels 5, 6 has to be adapted.

All of the embodiments described in FIGS. 1 to 3 may comprise holder 3 with a first support wheel 5 and a second support wheel 6 that are arranged such that the angle 29 lies within the above mentioned ranges.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 handling device
2 friction wheel 3 holder
4 container
5 first support wheel
6 second support wheel
7 suction element
8 arrow (handling device)
9 first transfer position
10 inspection area
11 second transfer position
12 transportation device
13 first transfer device
14 second transfer device
15 holding arrangement (first transfer device)
16 suction element (first transfer device)
17A arrow (first transfer device)
17B arrow (second transfer device)
18 holding arrangement (second transfer device)
19 suction element (second transfer device)
20 structure
21 first axis
22 second axis
23 third axis
24 longitudinal axis
25 rotational axis
26 first plane
27 rotational axis
28 second plane
29 angle

What is claimed is:

1. An apparatus for inspecting a pharmaceutical cylindrical container made of glass or polymer, the apparatus comprising:
a handling device having a first holder configured to hold a lateral surface of the pharmaceutical cylindrical container, the first holder comprising a first support wheel and a second support wheel configured so that the lateral surface of the pharmaceutical cylindrical container is supported on the first support wheel and the second support wheel in a horizontal orientation during inspection, the handling device moves such that the pharmaceutical cylindrical container is transferred from a first transfer position to the inspection area and from the inspection area to a second transfer position; and
a friction wheel, wherein the handling device and/or the friction wheel are configured to rotate the pharmaceutical cylindrical container around a container longitudinal axis,
wherein the first support wheel has a first rotational axis and the second support wheel has a second rotational axis, a first plane being defined through the first rotational axis and the container longitudinal axis, a second plane being defined through the second rotational axis and the container longitudinal axis, and wherein the first and second planes intersect at an angle in a range of 45° to less than 120°,
wherein the pharmaceutical cylindrical container can be fed in sync with a clock frequency of the handling device by a transportation device.

2. The apparatus of claim 1, wherein the range is 50° to 90°.

3. The apparatus of claim 1, wherein the handling device moves such that the pharmaceutical cylindrical container is transferred from a first transfer position to an inspection area and from the inspection area to a second transfer position.

4. The apparatus of claim 3, wherein the handling device and/or the friction wheel are configured to move so that the pharmaceutical cylindrical container is in contact with the friction wheel and rotated around the container longitudinal axis by the first and second support wheels and/or by the friction wheel in the inspection area.

5. The apparatus of claim 1, wherein the handling device further comprises a second holder and a third holder, and wherein the first, second, and third holders are arranged on a circle with an angle of 120° to each other.

6. The apparatus of claim 1, wherein the transportation device moves the pharmaceutical cylindrical container to the first transfer position and receives the pharmaceutical cylindrical container at the second transfer position.

7. The apparatus of claim 6, further comprising a first transfer device and a second transfer device at the second transfer position, the first transfer device being configured to move the container from the transportation device to the first transfer position, and the second transfer device being configured to move the container from the second transfer position to the transportation device.

8. The apparatus of claim 7, wherein the handling device and the first and second transfer devices are configured to move at least 60 containers per minute from the first transfer position to the inspection area and from the inspection area to the second transfer position.

9. The apparatus of claim 7, wherein the handling device and the first and second transfer devices are configured to move 80 containers per minute from the first transfer position to the inspection area and from the inspection area to the second transfer position.

10. The apparatus of claim 7, wherein the first transfer device comprises three holding arrangements arranged on a circle with an angle of 120° to each other, the first transfer device being rotatable so that the three holding arrangements move among positions at the transportation device, the first transfer position, and a free position.

11. The apparatus of claim 7, wherein the second transfer device comprises three holding arrangements arranged on a circle with an angle of 120° to each other, the second transfer device being rotatable so that the three holding arrangements move among positions at the transportation device, the second transfer position, and a free position.

12. The apparatus of claim 7, wherein the first and/or second transfer devices comprise holding arrangements that are suction elements.

13. The apparatus of claim 1, wherein the first and second support wheels comprise a material selected from a group consisting of polymer, polyoxymethylene, polyacetale, steel, and ball bearing steel.

14. The apparatus of claim 1, wherein the handling device moves along a first axis.

15. The apparatus of claim 14, wherein the handling device further comprises a second holder and a third holder configured to move along the first axis.

16. The apparatus of claim 14, wherein the second holder is configured to move along a second axis and the third holder is configured to move along a third axis.

17. The apparatus of claim 16, further comprising a cam gear and/or an electromotor configured to move the handling device along the first, second, and third axes.

18. The apparatus of claim 1, wherein the handling device is configured to move at least 60 containers per minute from the first transfer position to the inspection area and from the inspection area to the second transfer position.

19. The apparatus of claim 1, wherein the handling device is configured to move 80 containers per minute from the first transfer position to the inspection area and from the inspection area to the second transfer position.

20. An apparatus for inspecting a pharmaceutical cylindrical container made of glass or polymer, the apparatus comprising:
- a handling device having a first holder configured to hold a lateral surface of the pharmaceutical cylindrical container, the first holder comprising a first support wheel and a second support wheel, the handling device moves so that the pharmaceutical cylindrical container is transferred from a first transfer position to the inspection area and from the inspection area to a second transfer position; and
- a friction wheel, wherein the handling device and/or the friction wheel are configured to rotate the pharmaceutical cylindrical container around a container longitudinal axis,
- wherein the first support wheel has a first rotational axis and the second support wheel has a second rotational axis, a first plane being defined through the first rotational axis and the container longitudinal axis, a second plane being defined through the second rotational axis and the container longitudinal axis, and wherein the first and second planes intersect at an angle in a range of 45° to less than 120°, wherein the handling device moves along a first axis, wherein the handling device has a second holder and a third holder, wherein the second holder is configured to move along a second axis and the third holder is configured to move along a third axis, wherein the first axis and the second axis intersect at an angle in a range of 30° to 60° and/or wherein the first axis and the third axis intersect at an angle in a range of 30° to 60°.

* * * * *